United States Patent [19]

Itou et al.

[11] Patent Number: 4,880,435

[45] Date of Patent: Nov. 14, 1989

[54] ALKALINE STORAGE CELL AND MANUFACTURING METHOD THEREFOR

[75] Inventors: Tsukasa Itou; Ryuji Kawase, both of Sumoto; Yuji Morioka, Hyogo; Masao Ichiba, Sumoto, all of Japan

[73] Assignee: Sanyo Electric Co., Ltd., Moriguchi, Japan

[21] Appl. No.: 195,755

[22] Filed: May 19, 1988

[30] Foreign Application Priority Data

| May 20, 1987 | [JP] | Japan | 62-123312 |
| Nov. 27, 1987 | [JP] | Japan | 62-300516 |
| Dec. 16, 1987 | [JP] | Japan | 62-319310 |
| Dec. 17, 1987 | [JP] | Japan | 62-320224 |
| Jan. 11, 1988 | [JP] | Japan | 63-3345 |

[51] Int. Cl.$^4$ ............................................. H01M 4/26
[52] U.S. Cl. ................................. 29/623.5; 429/222
[58] Field of Search .................... 29/623.5, 623.1; 429/222, 94; 148/6.14 A, 6.14 R; 141/1.1, 32

[56] References Cited

U.S. PATENT DOCUMENTS 4,713,126  12/1987  Woidt et al. .................... 429/222 X

FOREIGN PATENT DOCUMENTS 58-48990  11/1983  Japan .
59-83345   5/1984  Japan .
61-61227  12/1986  Japan .

Primary Examiner—Anthony Skapars
Attorney, Agent, or Firm—Armstrong, Nikaido Marmelstein, Kubovcik & Murray

[57] ABSTRACT

A rechargeable alkaline storage cell and a method of manufacturing the cell. The manufacturing method mainly comprises a first step of forming a cadmium electrode by coating a conductive support with a kneaded active material in paste form including cadmium oxide as a main component thereof while suppressing hydration of the kneaded active material, and a second step of producing cadmium hydroxide through hydration of the cadmium oxide. The cell comprises, as main components thereof, a positive electrode including a rechargeable active material, a paste type negative cadmium electrode including cadmium hydroxide produced by chemical hydration, a separator disposed between the positive electrode and the negative electrode, and an electrolyte impregnating the separator.

6 Claims, 10 Drawing Sheets

ALKALINE STORAGE CELL AND MANUFACTURING METHOD THEREFOR

BACKGROUND OF THE INVENTION (1) Field of the Invention

The present invention relates to alkaline storage cells such as nickel-cadmium storage cells which employ a paste type cadmium electrode as their negative electrode, and to manufacturing methods therefor.

(2) DESCRIPTION OF THE PRIOR ART

A cadmium electrode of the paste type which requires a relatively simple manufacturing process and low manufacturing cost is in wide industrial use as the cadmium electrode for alkaline storage cells such as nickel-cadmium cells. Generally, the paste type cadmium electrode is manufactured through a series of operations which include kneading powder of an active material such as cadmium oxide or cadmium hydroxide with reinforcing fibers for providing the electrode with good strength, a binder such as polyvinyl alcohol for binding these materials, and water or any other suitable solvent to form an active material paste, coating the paste on surfaces of a conductive support, drying the paste, carrying out an electrochemical formation of the electrode as desired, and cutting the product to a size suited to the type of cell for which the electrode is intended. When the active material paste is prepared by adding the binder and water to cadmium oxide powder, cadmium oxide reacts with water and changes into cadmium hydroxide thereby expediting hardening of the active material paste. This presents serious operational difficulties to the manufacture of cells, and impedes production of cells having uniform quality. In order to prevent cadmium oxide from changing into cadmium hydroxide during the cell manufacturing process, phosphate, silicate or the like is addd to the active material paste formed of cadmium oxide, binder and water (as disclosed in Japanese Patent Publication No. 58-48990). In another measure taken, an organic solvent is used instead of water for preventing hardening of the active material due to the hydration of cadmium oxide. These measures are effective to avoid the operational difficulties due to the hardening of the active material paste, and to provide the advantage of increasing the rate of filling the active material by a rolling operation in that the active layer paste is maintained soft.

However, the soft active material layer has a disadvantage when used for forming a spiral wound electrode. Particularly where pressure rollers or the like are used to wind the electrode to form a spiral wound electrode, the pressure applied to the electrode increases progressively from the beginning to the end of the winding. As a result, the unhydrated cadmium electrode has its thickness reduced substantially linearly from the portion wound at the beginning to the portion wound at the end, which accompanies a reduction in the porosity of the electrode. It is thus extremely difficult to form a spiral wound electrode with the cadmium electrode while maintaining uniform porosity longitudinally of the electrode.

On the other hand, where the cadmium electrodes of the same thickness are used, the unhydrated cadmium electrode generally has a lower average porosity than the electrochemically formed cadmium electrode having cadmium oxide essentially changed into cadmium hydroxide in the course of the electrochemical formation. Thus, where the cell employing the unhydrated cadmium electrode is filled with the same amount of electrolyte as the cell employing the electrochemically formed cadmium electrode, the unhydrated cadmium electrode is capable of holding a smaller amount of electrolyte because of the lower average porosity and, therefore, the former cell has the electrolyte in the greater amount between the positive and negative electrodes. With the type of cell in which oxygen gas generated by the positive electrode at charging times is absorbed by the negative electrode, there is a proper level for the amount of electrolyte present between the positive and negative electrodes. An amount of electrolyte exceeding this level will prevent the oxygen gas from reaching the negative electrode. The excessive amount of electrolyte lowers the oxygen gas consumption capability of the cadmium electrode especially during initial charge and discharge cycles immediately following cell fabrication. Accordingly, the electrolyte must be injected into the cell in a limited amount in order that the oxygen gas consumption capability be above a certain level. With progress of the charge and discharge cycles, electrically charged inactive metallic cadmium increases and accumulates in the cadmium electrode. Consequently, the electrode has an increased average porosity and holds an increased amount of electrolyte thereby to reduce the amount of electrolyte present between the positive and negative electrodes, which leads to deterioration in discharge characteristics of the cell. This situation may be avoided if the cell is formed by the aforesaid electrochemical process, but the electrochemical formation requires extensive equipment, increased processing steps and high manufacturing cost. Thus, a truly satisfactory method of manufacturing alkaline storage cells has not been developed yet.

Further, when a spiral wound electrode assembly is formed by using the paste type cadmium electrode as the negative electrode, a separator is disposed around the outermost periphery of the electrode assembly to protect the cadmium electrode. This separator fixed with a tape is disposed to facilitate insertion of the electrode assembly to the can.

Proposals have been made in recent years to dispense with such a separator for high energy density of the cell. The paste type negative cadmium electrode, however, has an active material layer of low mechanical strength, and the active material tends to fall easily. Thus, there arises the inconvenience of the soft active material layer becoming peeled off when th spiral wound electrode assembly is inserted into the can. This is a problem peculiar to the paste type negative cadmium electrode not subjected to the electrochemical formation.

Where a cadmium electrode of the sintered type having a solid surface is used, it is possible to dispense with the separator disposed peripherally of the electrode assembly. However, the sintered type, compared with the paste type, has the disadvantages of complicated manufacturing process and high manufacturing cost.

SUMMARY OF THE INVENTION

The object of the present invention, therefore, is to provide an improved alkaline storage cell and manufacturing method thereof, which promotes charge and discharge characteristics.

Another object of the present invention is to provide a method of manufacturing alkaline storage cells, which is capable of checking a reduction in the porosity of the cadmium electrode during the electrode manufacturing process.

A further object of the invention is to provide an alkaline storage cell and manufacturing method thereof, which is capable of promoting the oxygen gas consumption capability of the cadmium electrode when assembling the electrode into the cell, and checking an increase in the internal gas pressure of the cell.

A still further object of the invention is to provide an alkaline storage cell and manufacturing method thereof which improves high rate discharge characteristics.

A still further object of the invention is to provide an alkaline storage cell and manufacturing method thereof, which is capable of checking generation of hydrogen gas at times of overcharge at low temperatures.

A still further object of the invention is to provide an alkaline storage cell and manufacturing method thereof, which is capable of providing the cell with an improved high energy feature by increasing the holding strength of the active material layer when forming a spiral wound electrode assembly with the cadmium electrode, and thereby dispensing with the separator otherwise disposed peripherally of the electrode assembly.

The above objects are fulfilled according to the present invention by a method of manufacturing a rechargeable alkaline storage cell comprising a first step of forming a cadmium electrode by coating a conductive support with a kneaded active material in paste form including cadmium oxide as a main component thereof while suppressing hydration of the kneaded active material, a second step of producing cadmium hydroxide through hydration of the cadmium oxide, and a third step of assembling the cadmium electrode having undergone the hydration into a can.

The objects of the invention are fulfilled also by a rechargeable alkaline storage cell comprising a positive electrode including a rechargeable active material as a main component thereof, a paste type negative cadmium electrode including cadmium hydroxide produced by chemical hydration, a separator disposed between the positive electrode and the negative electrode, and an electrolyte impregnating the separator.

In the method noted above, the hydration of the kneaded active material may be suppressed in the first step by adding an oxyacid salt to the kneaded active material and utilizing water as a dispersion medium.

Preferably, the second step carries out the hydration by immersing the cadmium electrode in an aqueous alkaline solution This aqueous alkaline solution may comprise an aqueous solution of caustic soda.

The second step may be followed by an additional step of impregnating the cadmium electrode with a hydrophobic high polymer. In this case, zinc powder may be added in the kneaded active material in paste form in the first step.

The cell manufactured by the above method may be injected with an electrolyte which includes caustic soda.

Preferably, the cadmium hydroxide mainly comprises the $\gamma$ type.

Furthermore, the electrolyte may include caustic soda in an amount of 15-60 mol %.

In a preferred embodiment of the invention the cadmium electrode is coated with a thin conductive layer having a hydrophobic polymer dispersed therein.

In one specific aspect, the positive electrode and the negative electrode are wound with the separator in between to form a spiral wound electrode assembly. The paste type negative cadmium electrode is exposed from an outer periphery of the spiral wound electrode assembly and fixed. This spiral wound electrode assembly is placed in a can.

The foregoing objects are fulfilled according to the present invention for the following reasons.

A cadmium electrode is formed by coating a conductive support with a kneaded active material paste having cadmium oxide as its main component while suppressing hydration of the active material. The cadmium oxide acting as the main active material is hydrated only after the cadmium electrode is formed. The hydration produces cadmium hydroxide in growths of crystalline particles having a substantially uniform size and large secondary particles inside the layer of active material paste applied to the conductive support. As a result, the layer of active material has a slightly increased thickness, and an increased porosity due to random formation of relatively large voids. Besides, the hydration produces a crystalline matrix which promotes the mechanical strength of the electrode in the direction of its thickness and reduces the influences of pressure to which the electrode is subjected at the winding time. This is effective for suppressing variations in the average porosity of the electrode in the longitudinal direction thereof. Consequently, the cadmium electrode obtained by the manufacturing method according to the present invention has improved oxygen gas cnnsumption capability, thereby to permit a large amount of electrolyte to be injected into the cell. This feature allows improvements in the charge and discharge cycle characteristics and the overcharge performance of the cell as well.

The following effects are produced particularly where caustic soda is used in the hydration for forming cadmium hydroxide mainly comprising $\gamma$ type in the cadmium electrode.

(1) The oxygen gas consumption capability is further promoted.

(2) The generation of hydrogen gas is suppressed at low temperature overcharging times.

(3) The negative electrode is chargeable in greater depth since $\gamma$-cadmium hydroxide, unlike $\beta$-cadmium hydroxide, does not allow charged metallic cadmium to accumulate in tne electrode by completely covering up the charged metallic cadmium. This feature minimizes cell deterioration occurring with high rate discharge cycles.

It is due to the fact that $\gamma$-cadmium hydroxide has a needle-like fine crystal structure in contrast to $\beta$-cadmium hydroxide, and hence has excellent reactivity.

The above effects are maintained further where the electrolyte includes caustic soda. In the presence of an aqueous solution of caustic potash or lithium hydroxide, $\gamma$-cadmium hydroxide is unstable and changes into $\beta$-cadmium hydroxide in time. However, if caustic soda is added to the electrolyte, $\gamma$-cadmium hydroxide becomes stable and the change from $\gamma$-cadmium hydroxide into $\beta$-cadmium hydroxide is suppressed. This is believed the reason for the advantageous performance of the cell to be maintained These advantages become supreme if the electrolyte of the cell contains caustic soda in an amount of 15-60 mol %. Where the caustic soda content is less than 15 mol %, caustic potash or lithium hydroxide also contained in the electrolyte causes $\gamma$-cadmium hydroxide to change into $\beta$-cadmium hydroxide with progress in the charge and discharge cycles or with lapse of a long shelf period. Where the caustic soda content exceeds 60 mol %, the large amount of caustic soda having poor conductivity reduces the conductivity of the electrolyte thereby to reduce the cell capacity although there is no problem in securing $\gamma$-cadmium hydroxide.

Further, by forming a conductive layer comprising conductive powder on surfaces of the cadmium electrode and impregnating the cadmium electrode with a hydrophobic polymer, a thin conductive layer dispersed with the hydrophobic polymer is formed on surfaces of the cadmium electrode whereby the electrode surfaces become easily contactable by oxygen gas. As a result, oxygen gas is consumed and absorbed through reaction with metallic cadmium produced by charging immediately under the thin conductive layer. This feature further promotes the oxygen gas consumption capability and the overcharge performance as well.

Where metallic zinc is added to the active material, cadmium oxide is changed into metallic cadmium by metallic zinc during the treatment with an aqueous alkaline solution in the chemical hydration process. This metallic cadmium is highly active and forms an excellent conductive matrix, which improves the oxygen gas consumption capability, compared with the case of adding metallic cadmium in the same amount in an ordinary way. Since a fluororesin dispersion adheres to this cadmium electrode, three-phase surfaces are advantageously produced by a combined effect of the hydrophobic property of the fluororesin and the substitution of metallic cadmium, whereby the oxygen gas consumption capability is promoted still further. Besides, the advantageous formation of conductive matrix is capable of suppressing hydrogen gas generation at times of low temperature overcharging.

Moreover, the mechanical strength of the negative electrode is increased by forming a spiral wound electrode assembly with the negative cadmium electrode of the paste type having undergone the chemical hydration. Thus, the separator at the outermost periphery of the electrode assembly may be dispensed with when placing the electrode assembly in a can. As a result, the cell interior occupying rate of the electrode is increased to enable high energy density in the cell.

Other features and advantages of the present invention will be apparent from the following description.

DESCRIPTION OF THE PREFERRED EMBODIMENTS

Preparation of Cadmium Electrode (Base Electrode X1)

900 grams of cadmium oxide powder acting as a main active material are mixed with 100 grams of metallic cadmium powder obtained by the chemical substitution method, which has an average particle size of 2 microns and acts as a precharged active material. The mixture is added with 6 grams of hydroxypropyl cellulose acting as a binder, 300 cc of 5% aqueous solution of sodium phosphate acting to inhibit hydration of the cadmium oxide, and 10 grams of 6-nylon fiber having lengths of about 1.5 mm and thicknesses of 1 to 2 deniers and acting as a reinforcing material. The mixture is then kneaded well to obtain an active material paste. A cadmium electrode is obtained by coating the paste on a conductive support comprising a punched metal, drying the paste, compressing the product to a thickness of 0.8 mm, and cutting it to 33 mm by 200 mm. The electrode is further compressed (by preliminary rolling) to 0.72 mm. At this stage the cadmium oxide is unhydrated. The electrode is immersed in an aqueous solution of caustic soda having a specific gravity of 1.30 for 30 minutes as a chemical hydration treatment. Thereafter the electrode is rinsed with pure water for one hour for a de-alkalizing treatment, and dried to regain a thickness of about 0.80 mm, thereby to produce a base electrode X1. It has been confirmed experimentally that, as a result of the chemical hydration treatment, the cadmium oxide has substantially entirely changed into $\gamma$-cadmium hydroxide. This base electrode X1 was used in the first to third embodiments described hereinafter.

First Embodiment

Example I

A cadmium electrode $a_1$ comprising the base electrode X1 (preliminary-rolled to 0.72 mm) was wound with a known positive nickel electrode of the sintered type (33 mm×160 mm and 0.70 mm thick) with a separator therebetween comprising a nonwoven nylon fabric, to form a spiral wound electrode assembly. An enclosed SC-size nickel-cadmium cell A1 according to the present invention having a 1.3AH nominal capacity wa obtained. This cell was injected with 5.2 grams of a three-component electrolyte having caustic potash as the main component (K:Na:Li=60:40:8) and a specific gravity of 1.29. With this cell, the separator held 50% of the entire electrolyte and the electrolyte in the cell had a specific gravity of 1.29.

Example II

A cadmium electrode $a_2$ was manufactured by using caustic potash having a specific gravity of 1.30 instead of the caustic soda having a specific gravity of 1.30 for hydrating the base electrode X1. A cell A2 according to the present invention was obtained by using this cadmium electrode $a_2$. The base electrode X1 was preliminary-rolled to 0.72 mm. It was confirmed that this cadmium electrode $a_2$ comprised partly $\gamma$-cadmium hydroxide but mostly $\beta$-cadmium hydroxide.

Comparative Example

A comparative cell A3 was obtained through the same manufacturing process as Example 1 except using a cadmium electrode $a_3$ which was not subjected to the preliminary compression in the preparation of the base electrode X1. This comparative cell A3 was injected with 5.3 grams of the three-component electrolyte having a specific gravity of 1.26. With this cell too, the separator held 50% of the entire electrolyte. The cadmium electrode $a_3$ became hydrated only when the electrolyte was injected into the cell after the electrode was placed in the can. Consequently, the electrolyte in the cell had a specific gravity of 1.29 and its total amount was 4.5 grams.

The following experiments were carried out on these electrodes $a_1$, $a_2$ and $a_3$ and cells A1, A2 and A3.

(Experiment I)

Figure 1:
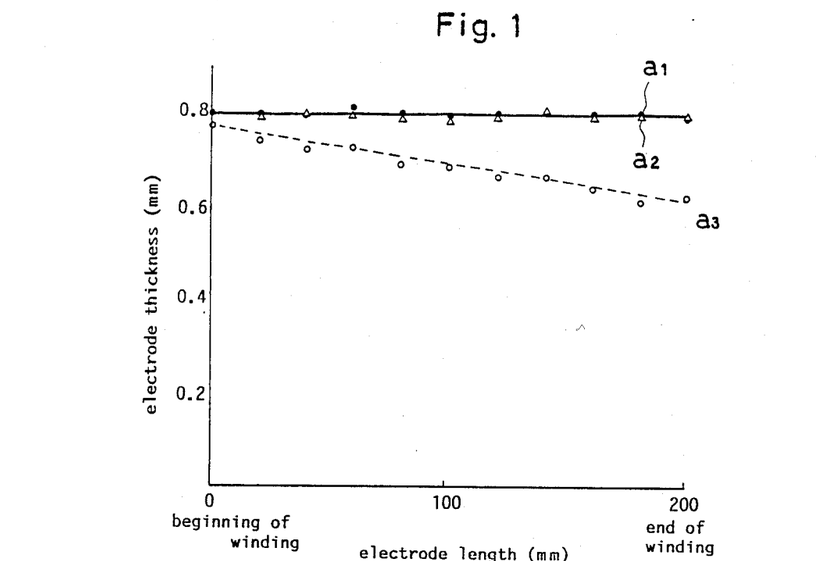
FIG. 1 is a view showing variations in the thickness, at electrode winding times, of cadmium electrodes $a_1$, $a_2$ and $a_3$ of cells A1 and A2 according to the present invention and comparative cell A2.

FIG. 1 shows variations in the thickness of cadmium electrodes $a_1$, $a_2$ and $a_3$ occurring when the electrodes were wound. It will be seen that, compared with the comparative electrode $a_3$, the electrodes $a_1$ and $a_2$ have the thickness varying within very limited ranges when wound. This is due to the fact that the electrodes $a_1$ and $a_2$ have already been hydrated by the time of winding, with improved mechanical strength of the active material layer in the paste form, which is capable of suppressing changes in the average porosity of the electrodes.

(Experiment II)

Figure 2:
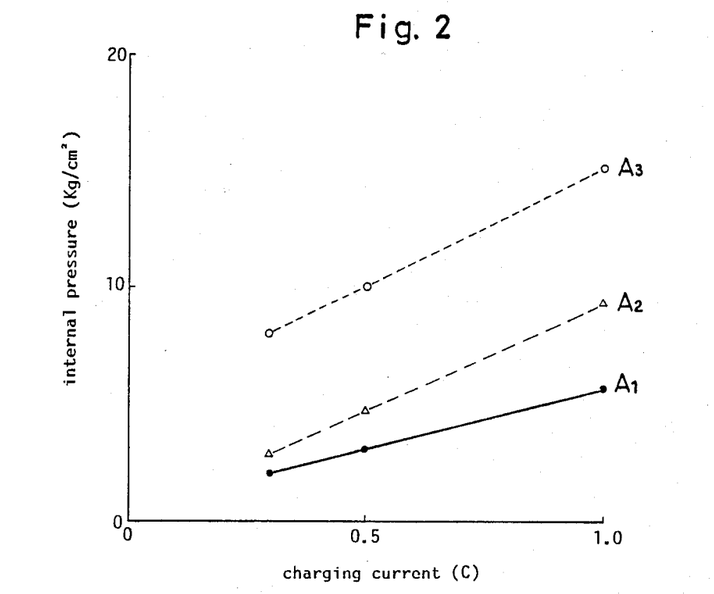
FIG. 2 is a view showing variations in the internal gas pressure of cells A1, A2 and A3.

Variations in the internal gas pressure of cells A1–A3 were checked by varying the charging current. The results are shown in FIG. 2. The experiment was conducted at room temperature, and the cells were charged up to 200% of the nominal capacity of the cells. The gas pressure increases are due to generation of oxygen gas since hydrogen gas is not generated in the cells at this time. It will be seen from these results that cells A1 and A2 according to the present invention have lower internal gas pressures than comparative cell A3 and are superior in oxygen gas consumption capability. This is because the electrodes according to the invention hardly change in the average porosity but maintain it at high levels at the time of winding the electrodes, and these results agree with the results of Experiment I. Besides, cell A2 has a lower internal gas pressure than cell A1. This is considered due to the difference in the form of cadmium hydroxide generated in the electrodes used for these cells. That is to say, cell A1 has cadmium hydroxide mainly comprising the $\gamma$ type generated therein whereas cell A2 has cadmium hydroxide mainly comprising the $\beta$ type. The $\gamma$ type is superior to the $\beta$ type in reactivity because of the needle-like fine crystal structure, and hence improved oxygen gas consumption capability.

(Experiment III)

Figure 3:
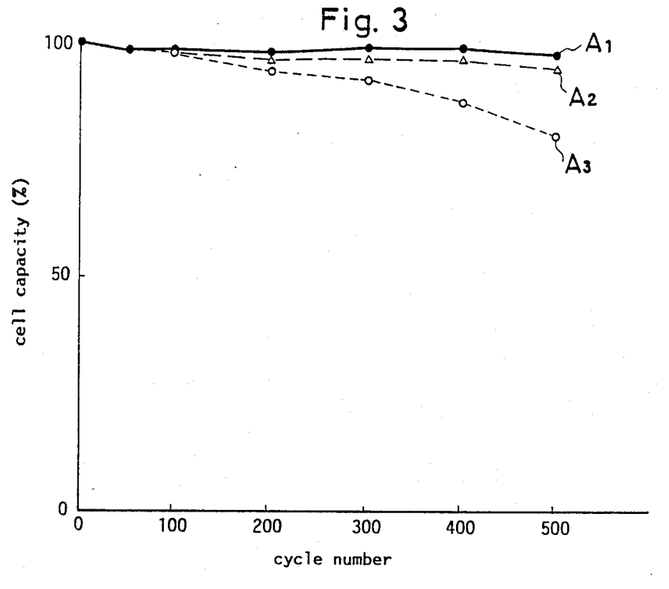
FIGS. 3 and 4 are views for comparing cycle characteristics of cells A1, A2 and A3.

A comparative experiment was conducted on cells A1, A2 and A3 with respect to cycle characteristics. The results of this experiment are shown in FIG. 3. In the experiment, the cells were charged with a current of 0.1C for 16 hours, and discharged with a current of 1C until the cell voltage fell to 1.0V. The results show that cells A1 and A2 according to the present invention have excellent cycee characteristics compared with comparative cell A3.

(Experiment IV)

Figure 4:
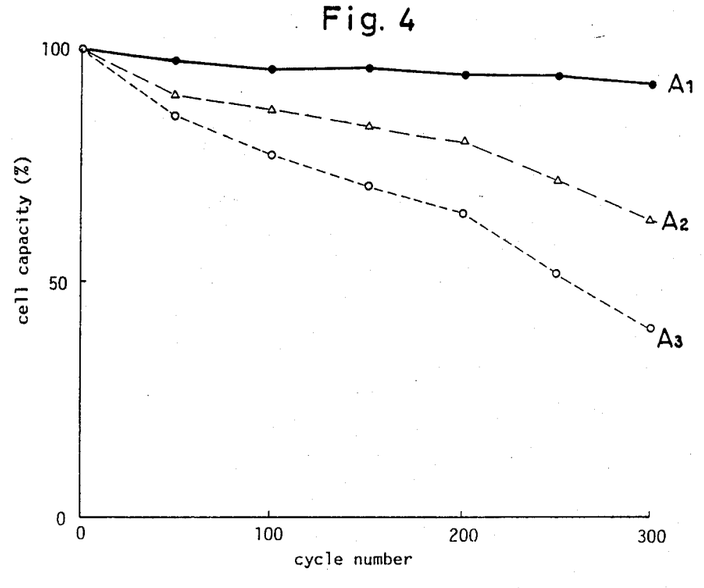

An experiment similar to the above comparative experiment was carried out, in which the discharge was effected with a current of 8C. The results of this experiment are shown in FIG. 4. It will be seen that cells A1 and A2 according to the present invention have excellent cycle characteristics compared with comparative cell A3 even when the high rate current of 8C is used for the discharge. The reason for cell A1 having a smaller degree of capacity reduction than cell A2 is considered to lie in the effect of $\gamma$-cadmium hydroxide present in the cadmium electrode.

(Experiment V)

Figure 5:
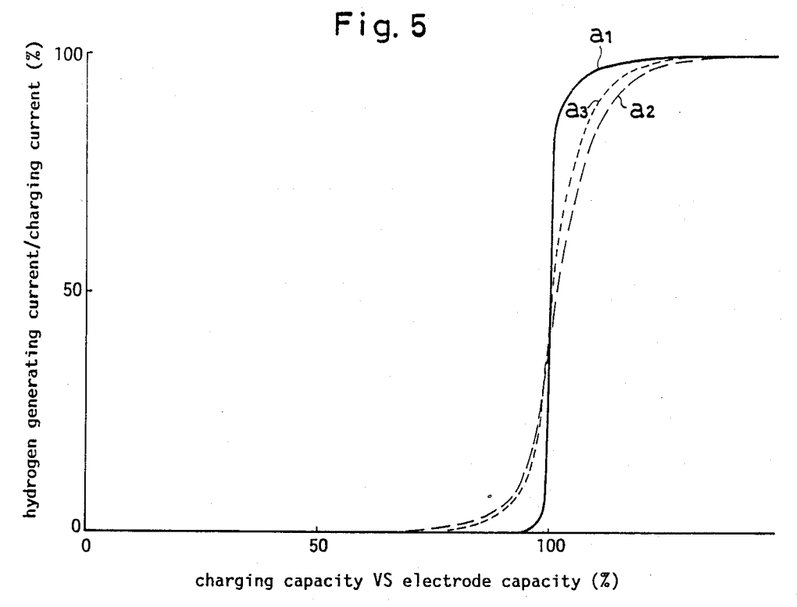
FIG. 5 is a view showing hydrogen generating current rates observed when electrodes $a_1$, $a_2$ and $a_3$ are charged.

Cadmium electrodes $a_1$, $a_2$ and $a_3$ were checked with respect to the hydrogen generating current rate of the charging time. The results are shown in FIG. 5. The experiment was conducted with a charging current of 0.6C which was the theoretical capacity of the cadmium electrode, at 0° C., and using an aqueous solution of caustic potash having a specific gravity of 1.23 as the electrolyte. It will be seen that electrode $a_2$ according to the invention and comparative electrode $a_3$ are almost equal in the hydrogen gas generation whereas electrode $a_1$, compared with comparative electrode $a_3$, has the hydrogen gas generation suppressed until the electrode is charged to the full. This is because the caustic soda used in preparing electrode $a_1$ of the present invention causes the generation of $\gamma$-cadmium hydroxide in the electrode, which improves the electrode conductivity thereby to suppress the hydrogen gas generation.

(Experiment VI)

Figure 6:
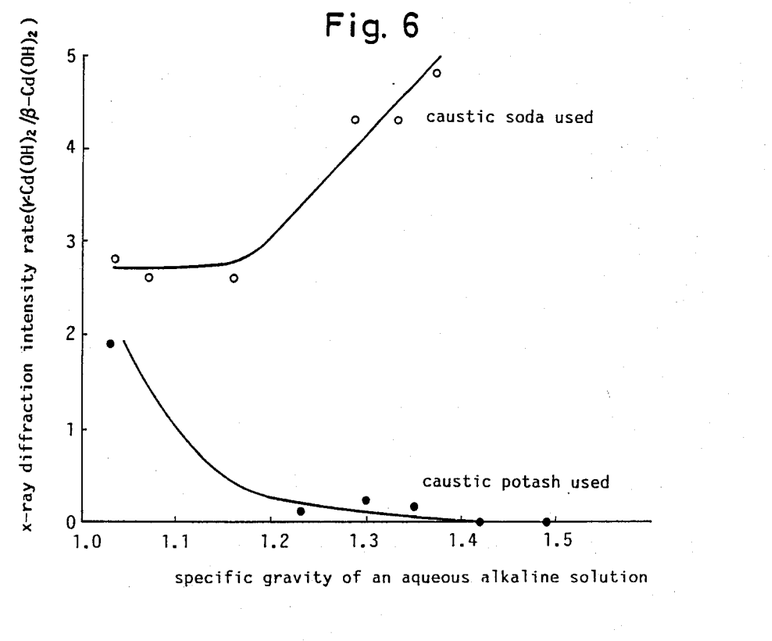
FIG. 6 is a view showing the ratio of $\beta$-cadmium hydroxide to $\gamma$-cadmium hydroxide occurring with varied specific gravities of an aqueous alkaline solution.

The ratio of $\gamma$-cadmium hydroxide with respect to $\beta$-cadmium hydroxide generated in the cadmium electrode was checked by varying the conditions for hydrating the cadmium electrode. The results are shown in FIG. 6. When the electrode is hydrated by using caustic potash, $\gamma$-cadmium hydroxide is generated effectively by means of a solution having a specific gravity not exceeding 1.1. On the other hand, when the electrode is hydrated by using caustic soda, $\gamma$-cadmium hydroxide is generated very effective by means of even the low concentration solution having a specific gravity not exceeding 1.1. Further, when an aqueous solution of caustic soda having a specific gravity exceeding 1.16, $\gamma$-cadmium hydroxide is generated to a remarkable extent, thereby enabling an improvement in electrode performance as well as suppression of the hydrogen gas generation.

(Experiment VII)

Checking was made of variations with time of the hydration by means of the aqueous alkaline solution in Examples 1 and 2. The effect was produced by the hydration even 10 minutes after the immersion, and no significant change took place with lapse of 1 to 24 hours.

In the described embodiment, the electrode is hydrated by means of an aqueous alkaline solution, then rinsed with pure water and dried. This process is not absolutely necessary, but the electrode is rinsed and dried to avoid a situation in which sodium carbonate ($Na_2CO_3$) and potassium carbonate ($K_2CO_3$) generated through reaction with caustic soda or caustic potash into which carbon dioxide gas mixes from the ambient air are carried into the cells to adversely affect the cell performance. The preliminary rolling is effected in order to adjust the thickness of the cadmium electrode and to provide the electrode assembly with an outer diameter fitting in the can of the cell. However, this step is not absolutely necessary either.

Second Embodiment

Example I

A thin conductive layer dispersed with a hydrophobic polymer was formed on the surfaces of the foregoing base electrode X1. To form the thin conductive layer, a kneaded mixture was prepared which comprised 100 parts by weight of water, 10 parts by weight of carbon powder acting as conductive powder, and 10 parts by weight of polyvinyl alcohol acting as a binder. The mixture was added with 10 parts by weight of unsintered fluororesin powder (trademarked Daiflon and manufactured by Daikin Kogyo K.K.) acting as the hydrophobic polymer, and was agitated by a disperser. Th secondary particles of fluororesin were pulverized and dispersed in fine powder form to produce a slurry. An electrode $b_1$ was obtained by coating and drying the slurry on both surfaces of the base electrode X1. The cadmium electrode $b_1$ thus obtained and a known positive nickel electrode of the sintered type (33 mm×160 mm with a thickness of 0.70 mm) were wound together with a separator in between which comprised a nonwoven cloth of nylon, to form a spiral wound electrode assembly. This electrode assembly was incorporated into an SC-size enclosed nickel-cadmium cell B1 according to the present invention, which had a nominal capacity of 1.3AH. This cell was injected with 5.2 grams of a three-component electrolyte having caustic potash as the main component (K:Na:Li=60:40:8) and a specific gravity of 1.29. With this cell, the separator held 50% of the entire electrolyte and the electrolyte in the cell had a specific gravity of 1.29.

Example II

The cadmium electrode comprising the base electrode X1 was used as it is to form electrode $b_2$ of the present invention. Cell B2 according to the present invention was prepared with the other aspects remaining the same as Example I above.

Example III

An electrode $b_3$ of the present invention was prepared in the same manner as Example I except that the unsintered fluororesin acting as the hydrophobic polymer was not included at all. Cell B3 according to the invention was fabricated in the same manner as Example I in the other aspects.

Comparative Example

A comparative cell B4 was fabricated in the same manner as Example 1 except that a cadmium electrode was now used which was not subjected to the chemical hydration in the preparation of the base electrode X1. This comparative cell B4 was injected with 5.3 grams of the same three-component electrolyte but having a specific gravity of 1.26. As a result, the electrode $b_4$ became hydrated, whereby the specific gravity of the electrolyte in the cell became 1.29, the amount of free electrolyte after one charge and discharge cycle was 4.5 grams, and the separator held 50% of the entire electrolyte. The following experiments were carried out on the cells B1–B4 comprising these electrodes $b_1$–$b_4$, respectively.

(Experiment I)

Figure 7:
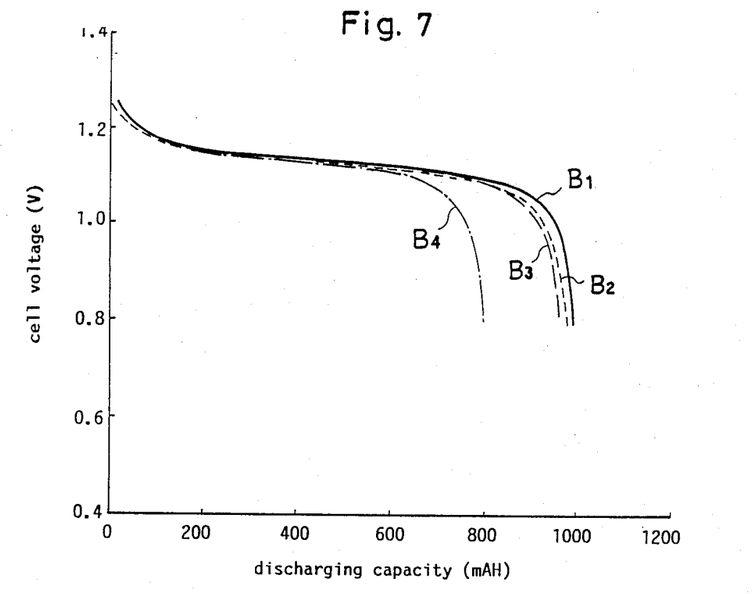
FIG. 7 is a view showing discharge characteristics of cells B1, B2 and B3 according to the present invention and comparative cell B4.

Cells B1–B4 were compared with respect to the high rate discharge capacity. The results of this experiment are shown in FIG. 7. The discharge current employed in the experiment was 8C (10.4A). It will be seen that cells B1–B3 according to the present invention comprising the electrodes subjected to the chemical hydration have greater discharge capacities than comparative cell B4.

(Experiment II)

Figure 8:
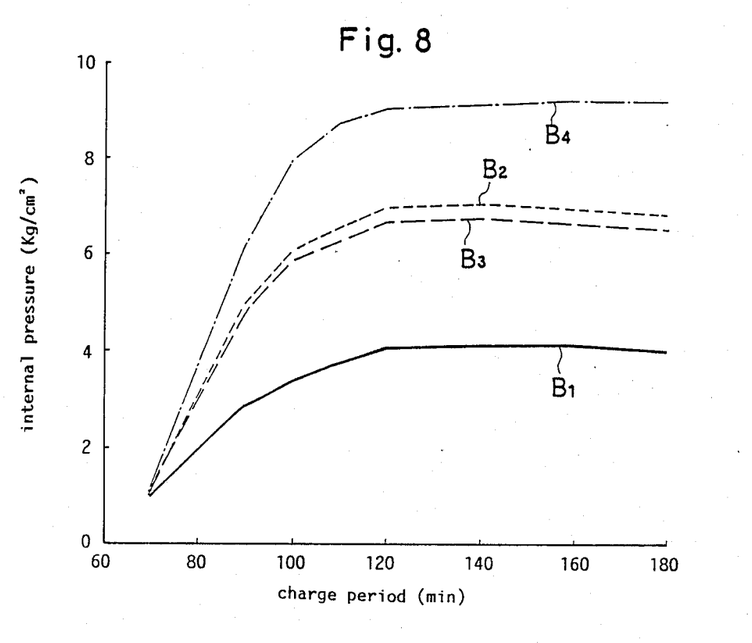
FIGS. 8 and 9 are views showing internal gas pressures of cells B1-B4.

Cells B1–B4 were attached with pressure gauges and overcharged to 200% with a current of 1.3A at 25° C. The cells were compared with respect to the internal gas pressure at this time. The results are shown in FIG. 8, which shows the relationship between charging time and internal gas pressure. It will be seen that cell B1 according to the present invention has a lower internal gas pressure than cells B2–B4. Both cells B1 and B3 of the invention have the cadmium electrode surfacially coated with a thin conductive layer of carbon powder, but cell B1 has a hydrophobic polymer dispersed through the conductive layer. It is understood that, as a result, cell B1 has improved oxygen gas consuming capability due to the action of the hydrophobic polymer, whereby its internal gas pressure is maintained at low levels.

(Experiment III)

Figure 9:
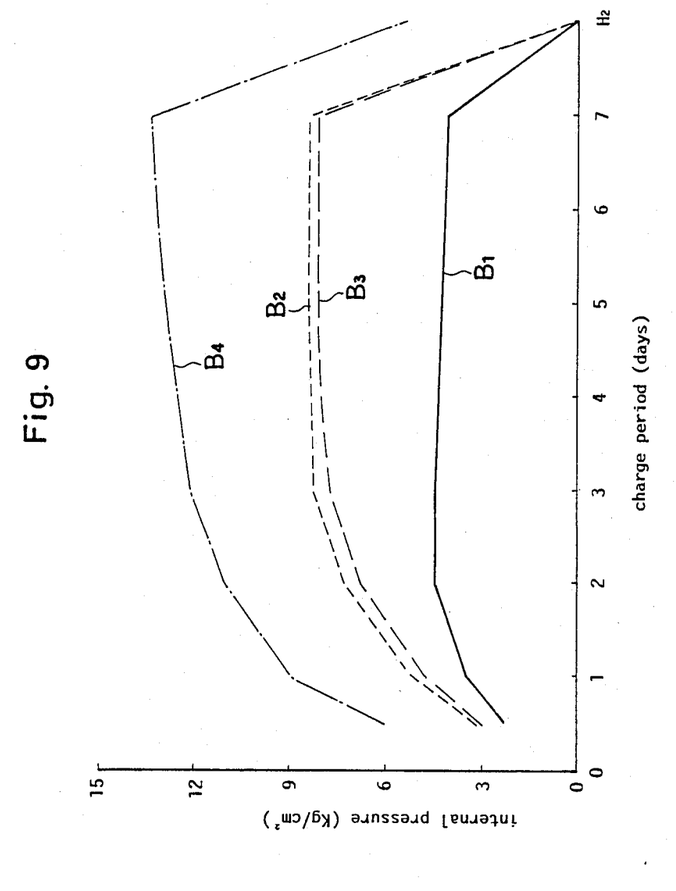

Cells B1–B4 were attached with pressure gauges as above and continuously charged for one week with a current of 260 mA at 0° C. The cells were compared with respect to the internal gas pressure at this time. The results are shown in FIG. 9, which shows the relationship between charging time and internal gas pressure. It will be seen that cell B1 according to the present invention has a lower internal gas pressure than cells B2–B4 as in Experiment II, and is capable of suppressing hydrogen gas which is readily generated at times of low temperature overcharging.

(Experiment IV)

Figure 10:
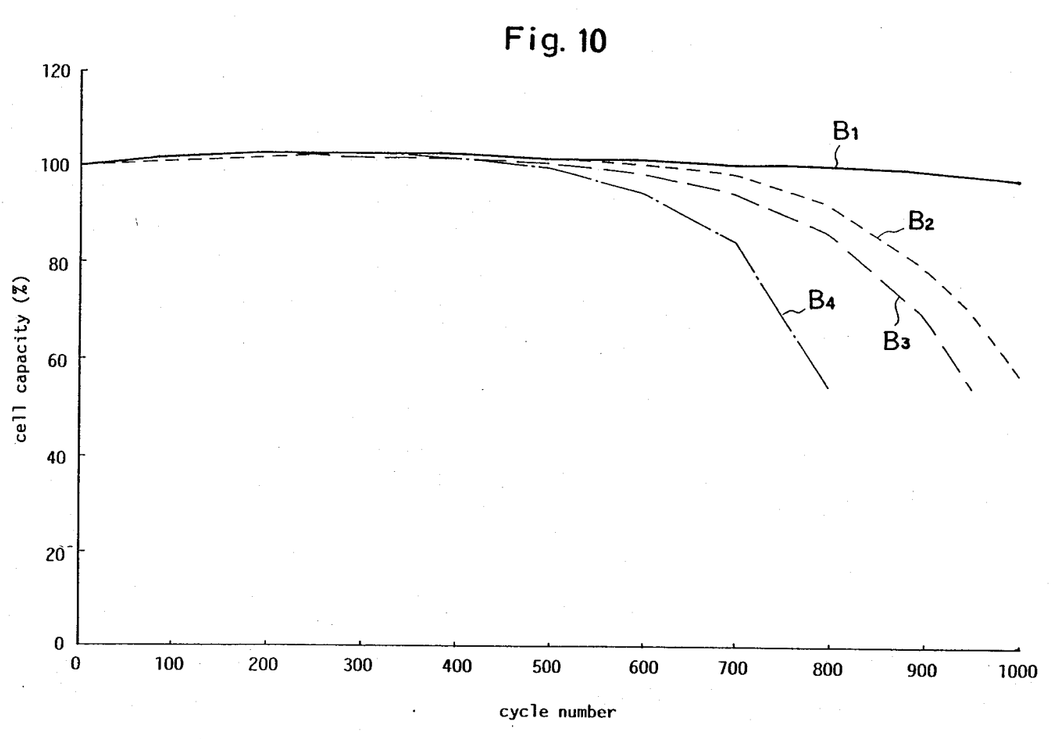
FIG. 10 is a view showing cycle characteristics of cells B1-B4.

Cells B1–B4 were compared with respect to cycle characteristics. In the experiment, the cells where charged with a current of 0.1C for 16 hours, and discharged with a current of 1C until the cell voltage fell to 1.0V. The results are shown in FIG. 10 which is a view of the cycle characteristics. It will be seen that cell B1 according to the present invention has excellent cycle characteristics compared wit cells B2 and B3 according to the invention and comparative cell B4.

It will be understood from the above observations that, overall, cell B1 according to the present invention is superior to cells B2 and B3 according to the invention and comparative cell B4. This is due to a combined effect produced by the chemical hydration of the paste type cadmium electrode and the thi conductive layer dispersed with the hydrophobic polymer and coated on the electrode surfaces.

According to the present invention, the chemical hydration is effected after the cadmium electrode is formed by coating the conductive support with the pasty kneaded active material mixture while suppressing its hydration. In the second embodiment the thin conductive layer is formed after the cadmium electrode is subjected to the chemical hydration, but the order of these steps may be reversed.

Further, although caustic soda is used for the chemical hydration, caustic potash having a specific gravity not exceeding 1.1 may also be able primarily to generate $\gamma$-cadmium hydroxide. Consequently, the cadmium electrode having the $\gamma$ type of excellent reactivity will improve the oxygen gas consuming capability.

When forming the thin conductive layer, water is used as a medium for dispersing carbon powder and water soluble polyvinyl alcohol as the binder. However, the dispersion medium may comprise organic solvent, for cxample, ethylene glycol, toluene, xylene, alcohol, ether, ketone or the like. The binder may comprise ethylene-vinyl ether copolymer or the like soluble in the above substances.

Third Embodiment

Example

A negative cadmium electrode $c_1$ comprising the foregoing base electrode $X_1$ and a known positive nickel electrode of the sintered type (33 mm × 160 mm with a thickness of 0.70 mm) were wound together with a separator in between which comprised a nonwoven cloth of nylon, to form a spiral wound electrode assembly. This electrode assembly was placed in a can to form an SC-size enclosed nickel-cadmium cell C1 according to the present invention, which had a nominal capacity of 1.3AH. The negative cadmium electrode $c_1$ was exposed from the outermost periphery of the spiral wound electrode assembly, and this periphery was applied with an adhesive tape having a width of 5 mm which was smaller than the width of the cadmium electrode to hold the latter immovable. It is not absolutely necessary to use this adhesive tape.

Comparative Example

A comparative cell C2 was prepared in the same manner as the above example except that a comparative electrode $c_2$ was used which comprised the base electrode $X_1$ without the hydration.

(Experiment)

20 samples of each of the cells C1 and C2 were fabricated and checked as to the falling of the active material. The falling ofthe active material was not found in any of the 20 samples of cell C1 according to the present invention. By contrast, all of the 20 samples of comparative cell C2 showed the falling of the active material and peeling thereof from the conductive support though cell C2 was the same as cell C1 in that the separator was not disposed on the outermost periphery of the electrode assembly. Thi experiment proves that the cell according to the present invention, in spite of being the paste type, is effective to prevent falling and peeling of the active material even if the separator is not disposed at the outermost periphery. Besides, the cell according to the present invention achieved a capacity increase of about 5% which corresponded to the outermost separator being dispensed with.

Fourth Embodimont

Example I

An active material paste wac obtained by mixing and kneading 900 grams of cadmium oxide powder acting as an active material, 200 grams of metallic cadmium powder acting as a precharged active material, 6 grams of hydroxypropyl cellulose acting as a binder, 10 grams of nylon fiber acting as a reinforcing agent, and 300 cc of 5% aqueous solution of sodium phosphate acting as a hydration inhibitor. The paste was coated and dried on both surfaces of a conductive support comprising a nickel-plated punched metal.

The product was cut and immersed in an aqueous solution of caustic soda having a specific gravity of 1.30 to provide a chemical hydration treatment. Through this treatment, the cadmium oxide was hydrated to generate $\gamma$-cadmium hydroxide.

Cadmium electrode $d_1$ thus obtained was wound with a known positive nickel electrode of the sintered type, with a separator therebetween comprising a nonwoven nylon fabric, to form a spiral wound electrode assembly.

This electrode assembly was placed in a can, and an electrolyte was injected thereinto which had a molar ratio of KOH:NaOH:LiOH=56:40:4 and a specific gravity of 1.3. Thus, an SC-size enclosed cell D1 according to the present invention having a 1200mAH nominal capacity was obtained.

Example II

A cell D2 was obtained in the same process as in Example 1 except that an electrolyte having a molar ratio of KOH:NaOH:LiOH=86:10:4 and a specific gravity of 1.30 was used here.

Example III

A cell D3 was obtained in the same process as in Example 1 except that an electrolyte having a molar ratio of KOH:LiOH=96:4 (without NaOH) and a specific gravity of 1.30 was used here.

The following experiments were carried out on these cells D1–D3 including negative electrodes $d_1$–$d_3$, respectively.

(Experiment I)

Figure 11:
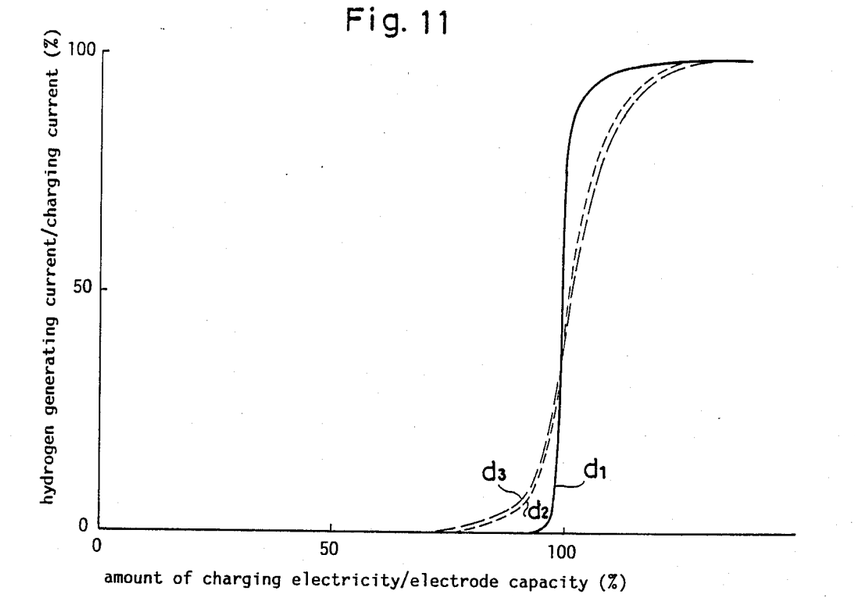
FIG. 11 is a view showing hydrogen generating characteristics of negative cadmium electrodes $d_1$, $d_2$ and $d_3$ at times of low temperature charging.

Cadmium electrodes $d_1$–$d_3$ were checked with respect to hydrogen generation taking place when the electrodes were charged in the respective electrolytes after immersing them in the electrolytes for two weeks. The experiment was conducted with a charging current of 0.6C with respect to the electrode capacity at 0° C. The results are shown in FIG. 11. The horizontal line represents the amount of charging electricity in percentage with respect to the capacity of the negative cadmium electrodes. The vertical line represents the amount of hydrogen generating current in percentage with respect to the charging current. It will be seen that negative electrodes $d_1$ and $d_2$ immersed in the electrolyte including caustic soda (NaOH) are more effective in checking hydrogen gas generation than electrode $d_3$.

Negative electrode d1 immersed in the electrolyte including caustic soda within the range of 15 to 60 mol %, specifically 40 mol %, has particularly outstanding characteristics. This is believed due to the generation of γ-cadmium hydroxide.

(Experiment II)

Figure 12:
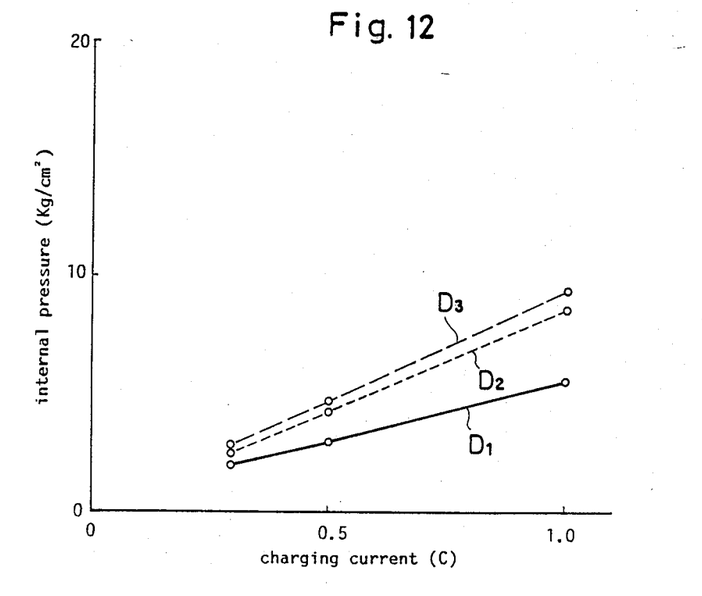
FIG. 12 is a view showing internal gas pressures of cells D1, D2 and D3 occurring with varied charging currents.

Internal gas pressures of cells D1–D3 were checked by varying the charging current at room temperature and charging the cells up to 200% of the nominal capacity of the cells after shelving them for one month following their fabrication. The results are shown in FIG. 12. It will be seen from these results that cells D1 and D2 have better oxygen gas consumption capabilities than cell D3. Cell D1 has a particularly low internal gas pressure, which is considered due to a great amount of γ-cadmium hydroxide present for effectively absorbing and consuming oxygen gas.

(Experiment III)

Figure 13:
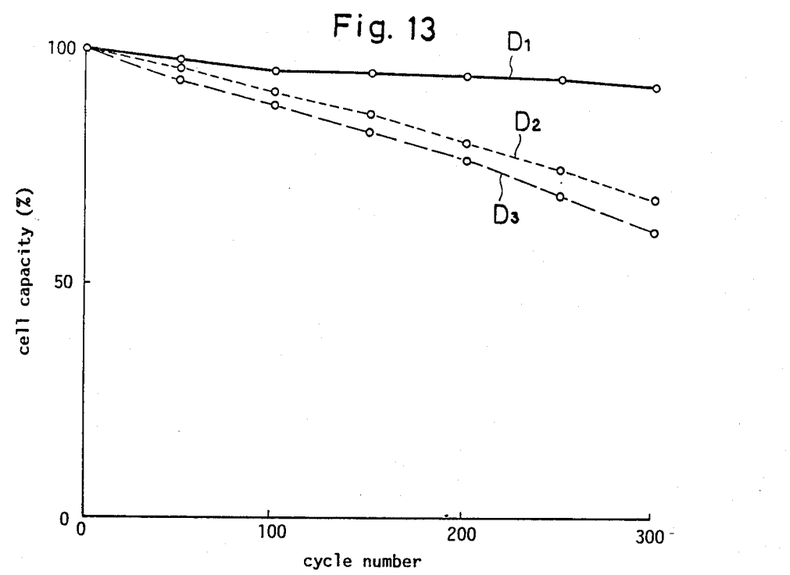
FIG. 13 is a view showing cycle characteristics of cells D1-D3.

A comparative experiment was conducted on cells D1–D3 with respect to cycle characteristics. The results of this experiment are shown in FIG. 13. In the experiment, the cells were charged with a current of 0.1C for 16 hours, and discharged with a current of 1.0C until the cell voltage fell to 1.0V. The results prove that cells D1 and D2 have excellent cycle characteristics compared with cell D3. Particularl cell D1 has superior characteristics, and the reason therefor is considered to lie in the large amount of γ-cadmium hydroxide as noted above.

(Experiment IV)

Figure 14:
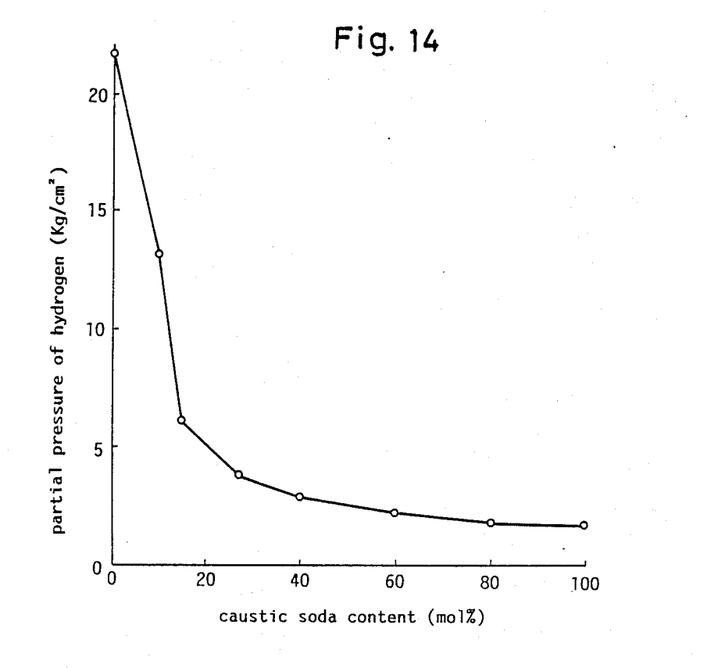
FIG. 14 is a view showing partial pressures of hydrogen in a cell observed when the caustic soda content of an electrolyte is varied.

Checking was made of partial pressures of hydrogen in the cells by varying the caustic soda content (mol %) of the electrolyte injected into the cells (with the amount of LiOH fixed to 4 mol %) and charging the cells with a current of 0.2C at 0° C for 120 hours. The experiment was carried out after shelving the cells for two weeks following their fabrication and one charge and discharge cycle effected at room temperature. FIG. 14 shows the results of the experiment. It will be seen that the hydrogen gas generation is suppressed to a great extent with the caustic soda content from about 15% upward.

(Experiment V)

Figure 15:
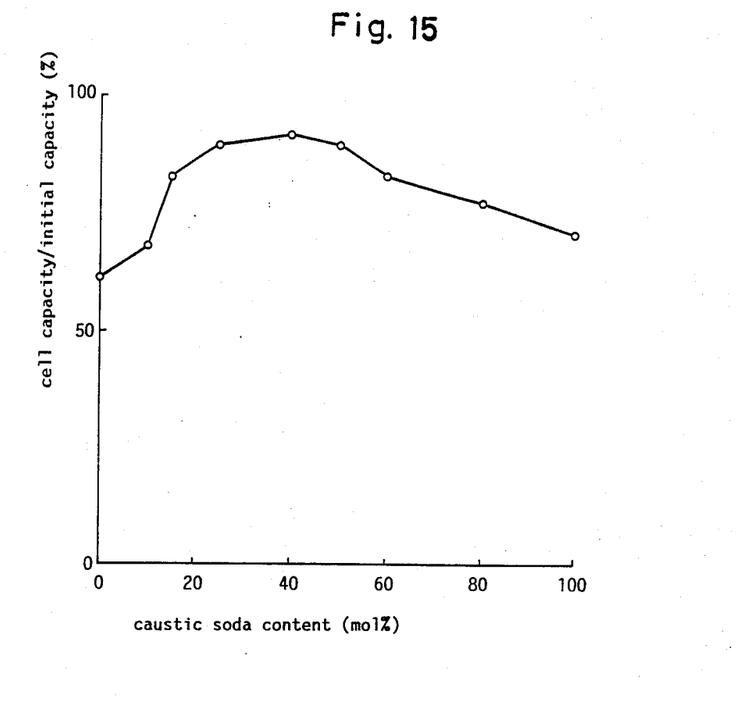
FIG. 15 is a comparative view of cell capacities observed when the caustic soda content of an electrolyte is varied.

The cells including electrolytes having various contents of caustic soda were compared with respect to the cell capacity after 500 cycles. FIG. 15 shows the results of this experiment. The experiment was conducted by using a charging current of 0.1C for 16 hours and a discharging current of 8C until the cell voltage fell to 1.0V. It will be seen from the results that the reduction in the cell capacity is greatly slackened with the caustic soda content from about 10 mol % upward. This tendency is particularly noteorthy with the caustic soda content below 60 mol %.

From the results of Experiments IV and V it will be understood that the electrolyte should preferably have a caustic soda content in the range of 15–60 mol %.

Fifth Embodiment

Example I

An active material paste was obtained by kneading 800 grams of cadmium oxide powder acting as an active material, 200 grams of metallic zinc powder, 20 grams of magnesium oxide acting as a dendrite inhibitor, 6 grams of hydroxypropyl cellulose acting as a binder, 10 grams of nylon fiber acting as a reinforcing agent, and 300 cc of a 5% aqueous solution of sodium phosphate acting as a hydration inhibitor. The paste was coated and dried on both surfaces of a conductive support comprising a punched metal. Then the product was immersed in a 25% aqueous solution of sodium hydroxide to effect a chemical hydration, rinsed and dried. Subsequently, the product was immersed in a fluororesin dispersion prepared by diluting Teflon 30-J (manufactured by DU PONT-MITSUI Fluorochemicals Co., Ltd.) with pure water to a strength of 1/20 to 1/30, and was dried to produce a cadmium electrode $e_1$ according to the present invention.

Example II

A cadmium electrode $e_2$ was obtained through the same manufacturing process as Example 1 except that 200 grams of metallic cadmium powder was used instead of 200 grams of metallic zinc powder.

Comparative Example

An active material paste was obtained by kneading 1000 grams of cadmium oxide powder acting as an active material, 20 grams of magnesium oxide acting as a dendrite inhibitor, 6 grams of hydroxypropyl cellulose acting as a binder, 10 grams of nylon fiber acting as a reinforcing,agent, and 300cc of a 5% aqueous solution of sodium phosphate acting as a hydration inhibitor. The paste was coated and dried on both surfaces of a conductive support comprising a punched metal. Subsequently, the product was immersed in the fluororesin dispersion prepared by diluting Teflon 30-J with pure water to a strength of 1/20 to 1/30, and was dried to produce a comparative electrode $e_3$ (which is based on a technical concept similar to that disclosed in Japanese Patent Publication Kokai No. 57-6463). This electrode $e_3$ was not subjected to the chemical hydration treatment.

These electrodes $e_1$, $e_2$ and $e_3$ were combined with a known nickel electrode of the sintered type with a separator therebetween to form SC-size cells E1, E2 and E3 having a nominal capacity of 1300 mAH, respectively. The following experiments were carried out on these cells.

(Experiment I)

Figure 16:
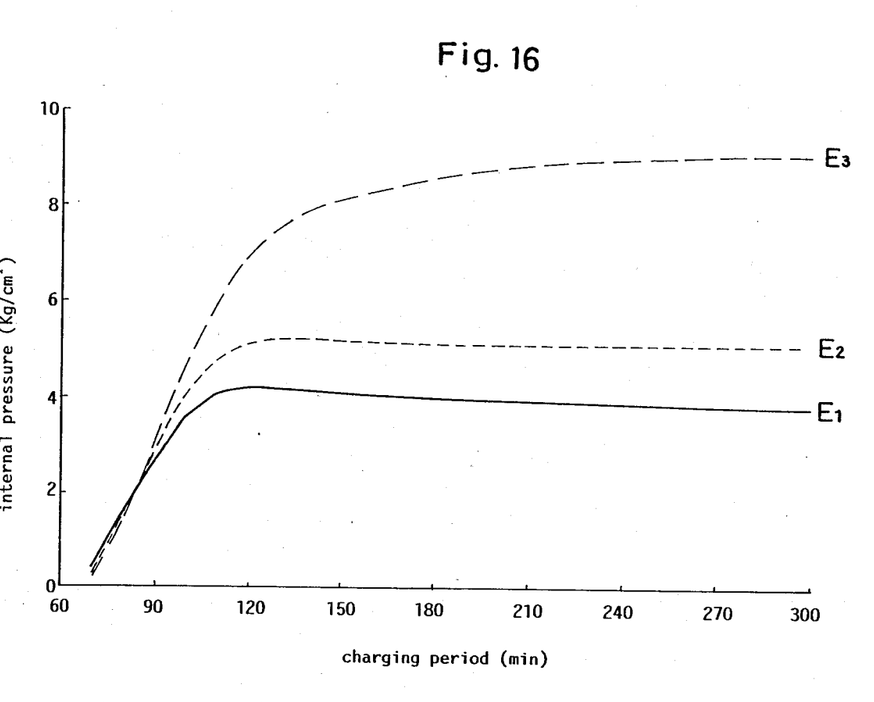
FIG. 16 is a view showing variations with time of the internal pressures of cells E1, E2 and E3.

Cells E1–E3 were charged at 25° C. with a current of 1.3A (1C). FIG. 16 shows variations in the internal gas pressure of the cells at this time. It will be seen from these results that cells E1 and E2 according to the present invention have very low internal gas pressures. This is because the negative electrode has increased porosity as a result of the hydration and the high porosity is maintained after the winding and because three-phase surfaces are effectively formed by combination of the hydrophobic property of fluororesin and the conductive matrix of metallic cadmium. The difference in gas consumption capability between cells E1 and E2 of the present invention is due to the difference in the extent of matrix formation by metallic cadmium. The metallic cadmium formed in substitution for metallic zinc is highly active, and is understood to form an excellent matrix.

(Experiment II)

Figure 17:
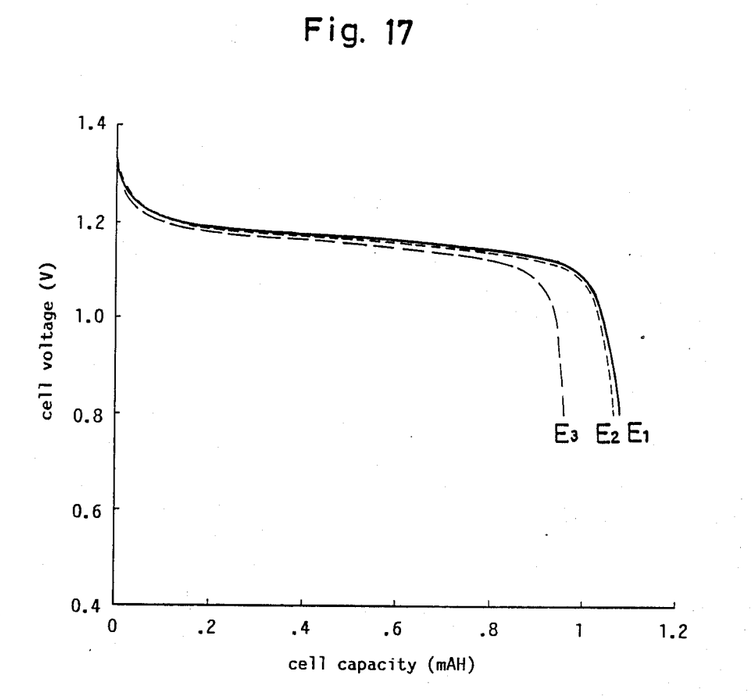
FIG. 17 is a view showing discharge characteristics of cells E1-E3.

Cells E1–E3 were charged at 25° C. with a current of 130 mA (0.1C) for 16 hours, and thereafter electricity was discharged in 10.4A (8C). FIG. 17 shows the result of this experiment. In FIG. 17, the horizontal axis represents cell capacity and the vertical axis represents cell voltage. It will be seen that cells E1 and E2 according to the present invention show highly efficient discharge characteristics. This is because the negative electrode is capable of holding a large amount of electrolyte by virtue of the increased porosity resulting from the hydration, and supplying a sufficient amount of hydroxide ion necessary to the discharge reaction.

(Experiment III)

Cell E1–E3 were charged at 0° C. with a current of 390 mA (0.3C) for one week, and their internal pressure and partial pressure of hydrogen were measured. The following table shows the results.

|  | Internal pressure ($kg/cm^2$) | Partial Pressure of Hydrogen ($kg/cm^2$) |
| --- | --- | --- |
| Cell E1 | 4.3 | 0 |
| Cell E2 | 5.8 | 0.8 |
| Cell E3 | 10.6 | 3.9 |

As seen from this table, cells E1 and E2 according to the present invention have low internal gas pressures and are capable of suppressing hydrogen gas generation. This is because the active material has increased conductivity due to the formation by metallic cadmium of a conductive matrix which makes the active material readily chargeable. Cell E1 in particular is proved to have a superior conductive matrix formed by the highly active metallic cadmium produced in substitution for metallic zinc.

In this embodiment the cadmium electrode is impregnated with a dispersion of fluororesin after providing the chemical hydration treatment, but this order may be reversed.

What is claimed is:

1. A method of manufacturing a rechargeable alkaline storage cell comprising:
    a first step of forming a cadmium electrode by coating a conductive support with an active material in paste form, the active material in paste form having been obtained by kneading active material powder including cadmium oxide as a main component thereof and an aqueous solution of an oxyacid salt which suppresses hydration of the cadmium oxide into cadmium hydroxide,
    a second step of converting substantially all of the cadmium oxide to cadmium hydroxide by immersing said cadmium electrode in an aqueous alkaline solution of hydration, and
    a third step of forming a spiral wound electrode by winding said cadmium electrode subjected to hydration and a positive electrode with a separator therebetween and incorporating said spiral wound electrode into a cell can.

2. A method as claimed in claim 1 wherein said oxyacid salt is selected from the group consisting of phosphate, silicate, arsenate and chromate.

3. A method as claimed in claim 1 further comprising a de-alkalizing step taken after said second step.

4. A method as clained in claim 1 further comprising a step of applying a pressure to said cadmium electrode after said first step.

5. A method as claimed in claim 1 wherein said aqueous alkaline solution comprises an aqueous solution of caustic soda.

6. A method as claimed in claim 1 wherein said second step is followed by an additional step of causing a hydrophobic polymer to adhere to said cadmium electrode.

* * * * *